(12) United States Patent
Martin et al.

(10) Patent No.: US 7,418,997 B2
(45) Date of Patent: Sep. 2, 2008

(54) RADIATOR DEBRIS REMOVING APPARATUS AND WORK MACHINE USING SAME

(75) Inventors: Kevin L. Martin, Washburn, IL (US); Dwight E. Elliott, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 11/311,808

(22) Filed: Dec. 19, 2005

(65) Prior Publication Data

US 2007/0137837 A1    Jun. 21, 2007

(51) Int. Cl.
    *F28G 1/16*    (2006.01)
(52) U.S. Cl. ............................ 165/95; 55/294; 15/405
(58) Field of Classification Search .............. 165/95; 55/294; 15/405; 134/22.1
    See application file for complete search history.

(56) References Cited

U.S. PATENT DOCUMENTS

| | | | | |
|---|---|---|---|---|
| 1,557,994 A * | 10/1925 | Dyson et al. ................. | 239/525 |
| 1,602,003 A * | 10/1926 | Drake .................... | 248/292.13 |
| 1,728,113 A * | 9/1929 | Fertally ...................... | 239/536 |
| 2,602,003 A * | 7/1952 | Wellborn .................... | 239/259 |
| 4,141,754 A * | 2/1979 | Frauenfeld .................... | 134/24 |
| 4,293,320 A * | 10/1981 | Robinson .................... | 96/427 |
| 4,420,313 A * | 12/1983 | Hada et al. .................... | 95/279 |
| 4,505,001 A | 3/1985 | Fasolino | |
| 4,649,987 A | 3/1987 | Frauenfeld et al. | |
| 4,655,799 A * | 4/1987 | Bosworth et al. ............. | 96/427 |
| 4,854,951 A * | 8/1989 | Stephenson .................. | 55/294 |
| 5,279,357 A * | 1/1994 | Kennon et al. ................. | 165/95 |
| 5,546,630 A | 8/1996 | Long | |
| 5,676,197 A | 10/1997 | Diebold et al. | |
| 5,879,466 A | 3/1999 | Creger et al. | |
| 6,050,392 A * | 4/2000 | Straub ........................ | 198/495 |
| 6,217,638 B1 | 4/2001 | Van de Velde | |
| 6,249,931 B1 * | 6/2001 | Sato ............................ | 15/313 |
| 2003/0061725 A1* | 4/2003 | Riley et al. .................... | 34/236 |
| 2004/0035446 A1* | 2/2004 | Laurence ..................... | 134/30 |

OTHER PUBLICATIONS http://www.exair.com/airknife/stdak_frmain.htm; EXAIR Standard Air Knife; published on Internet prior to Nov. 22, 2005.

* cited by examiner

*Primary Examiner*—Teresa J Walberg
(74) *Attorney, Agent, or Firm*—Liell & McNeil

(57) ABSTRACT

A radiator assembly includes a finned radiator core and a debris removing apparatus having a compressed air inlet and at least one compressed air outlet configured to direct compressed air through the radiator core. A work machine such as a wheel loader includes a radiator and a debris removing apparatus coupled with on-board compressed air and having at least one pressurized gas outlet configured to direct a gas toward the face of the radiator.

6 Claims, 2 Drawing Sheets

RADIATOR DEBRIS REMOVING APPARATUS AND WORK MACHINE USING SAME

This invention was made with Government support under DOE Contract No. DE-FC04-2002AL68081 awarded by the U.S. Department of Energy. The Government has certain rights to this invention.

TECHNICAL FIELD

The present disclosure relates generally to radiator assemblies for use in work machines, and relates more particularly to a radiator assembly for a work machine having a debris removing apparatus using on-board compressed air.

BACKGROUND

Many modern internal combustion engines use a radiator to dissipate heat from the engine and other systems. A typical radiator assembly includes a finned metallic core through which an engine coolant fluid is pumped. Air passing over the core dissipates heat from the fluid, and the heat is ultimately expelled to the ambient environment.

In recent years, various forces have elevated the cooling efficacy requirements for engine radiator assemblies. For example, recent and upcoming jurisdictional emissions regulations require that certain internal combustion engines, in particular diesel engines, operate with reduced output of certain emissions. As a result, various engine operating strategies have developed for reducing certain emissions; however, while some of these strategies show much promise, they can require more heat to be rejected by the engine for optimal performance than in traditional designs. The greater heat rejection requirements have in turn prompted a search for new and improved radiator assembly designs.

The more demanding requirements for radiators have thus far been addressed in several different ways. In some instances, radiators are simply made bigger, such that more surface area is available to transfer heat from the engine coolant fluid to air. While this approach is relatively straightforward, there can be significant spatial constraints inside the engine compartment of a work machine, and there are ultimately limitations on how large a radiator may be made. Often, stock radiators are already at or close to the maximum possible size of an available envelope without significantly redesigning the work machine. Moreover, increased size invariably adds weight, cost and manufacturing complexity to the work machine.

Another approach to improving radiator performance has been to increase the density of the radiator fins. In other words, more fins capable of transferring heat from the engine coolant fluid to the air are packed into a space equivalent to that available for a standard radiator. While this approach can ameliorate certain of the shortcomings of overly large radiators, it has its own set of problems. For instance, more densely packed radiator fins tend to become clogged with debris more readily. In traditional designs, organic debris such as leaves and other bits of plant matter, as well as inorganic debris such as road dust tend to pass fairly easily through the relatively widely spaced fins of the radiator core. In contrast, it can be more difficult for debris, in particular inorganic debris, to pass through the more closely packed fins of certain newer designs, reducing the heat exchange capacity of the radiator as the debris accumulates.

Debris packed in between the relatively closely spaced fins of certain modern radiator designs can reduce the ability of the radiator to transfer heat to the air, as less surface area may be available due to the insulating effect of caked-on, chalky debris, in particular inorganic debris. Filtering of both organic and inorganic debris can be done to a certain extent via particulate filters mounted on an exterior grill of the work machine. However, the relatively small size of inorganic particles, often as small as 2 microns, requires a very fine filter, which tends to cause such a pressure drop for air passing therethrough that insufficient air flow is available to the radiator itself.

Changes in overall engine system design have compounded the above problems for radiators with closely packed fins. For instance, rather than mounting a fan in front, some newer engine systems have the fan mounted between the engine and the radiator core, such that cooling air is drawn through the core rather than blown by the fan. Consequently, less air pressure is available from the fan to assist in blowing debris off of the radiator fins. Further still, where work machines used in the construction industry are concerned, the engine may often be mounted in the back. This, coupled with the fact that such machines do not typically attain particularly high ground speeds, means that relatively little air from travel of the work machine is available to blow debris from the radiator. As a result, the radiators of such work machines must typically be manually cleaned more frequently than is desirable, and more often than a typical maintenance schedule may allow.

One known approach to radiator debris problems is disclosed in U.S. Pat. No. 6,217,638 to Van de Velde. Van de Velde illustrates a process of removing debris from the grille filter of an engine, via a jet cleaner assembly that blows air tangentially to the surface of the grille. Van de Velde further describes a device for practicing the process, including an undulate filtration grille having a tangential blower and a supply of compressed air. Air is blown as desired via the tangential blower along each of a plurality of grooves in the surface of the grille filter. While Van de Velde recognizes that debris in the grille filter is undesirable, and provides one approach to the problem, the process and apparatus described are limited to certain grille types, and do not directly address the issue of debris clogging the radiator core itself.

The present disclosure is directed to one or more of the problems or shortcomings set forth above.

SUMMARY OF THE INVENTION

In one aspect, the present disclosure provides a radiator assembly including a finned radiator core and a debris removing apparatus having a compressed air inlet. The debris removing apparatus further includes at least one compressed air outlet configured to direct compressed air through the radiator core.

In another aspect, the present disclosure provides a work machine. The work machine includes a body, a pressurized gas supply and a radiator mounted to the body and including a finned radiator core having a face. The work machine further includes a debris removing apparatus having a pressurized gas inlet connecting with the pressurized gas supply, and at least one pressurized gas outlet configured to direct a gas toward the face of the radiator.

In still another aspect, the present disclosure provides a method of removing debris from a radiator of a work machine. The method includes connecting a compressed air supply of the work machine with an air inlet of a debris removing apparatus, and removing debris from the radiator at least in part by a step of passing compressed air through a finned core of the radiator via the debris removal apparatus.

DETAILED DESCRIPTION

Figure 1:
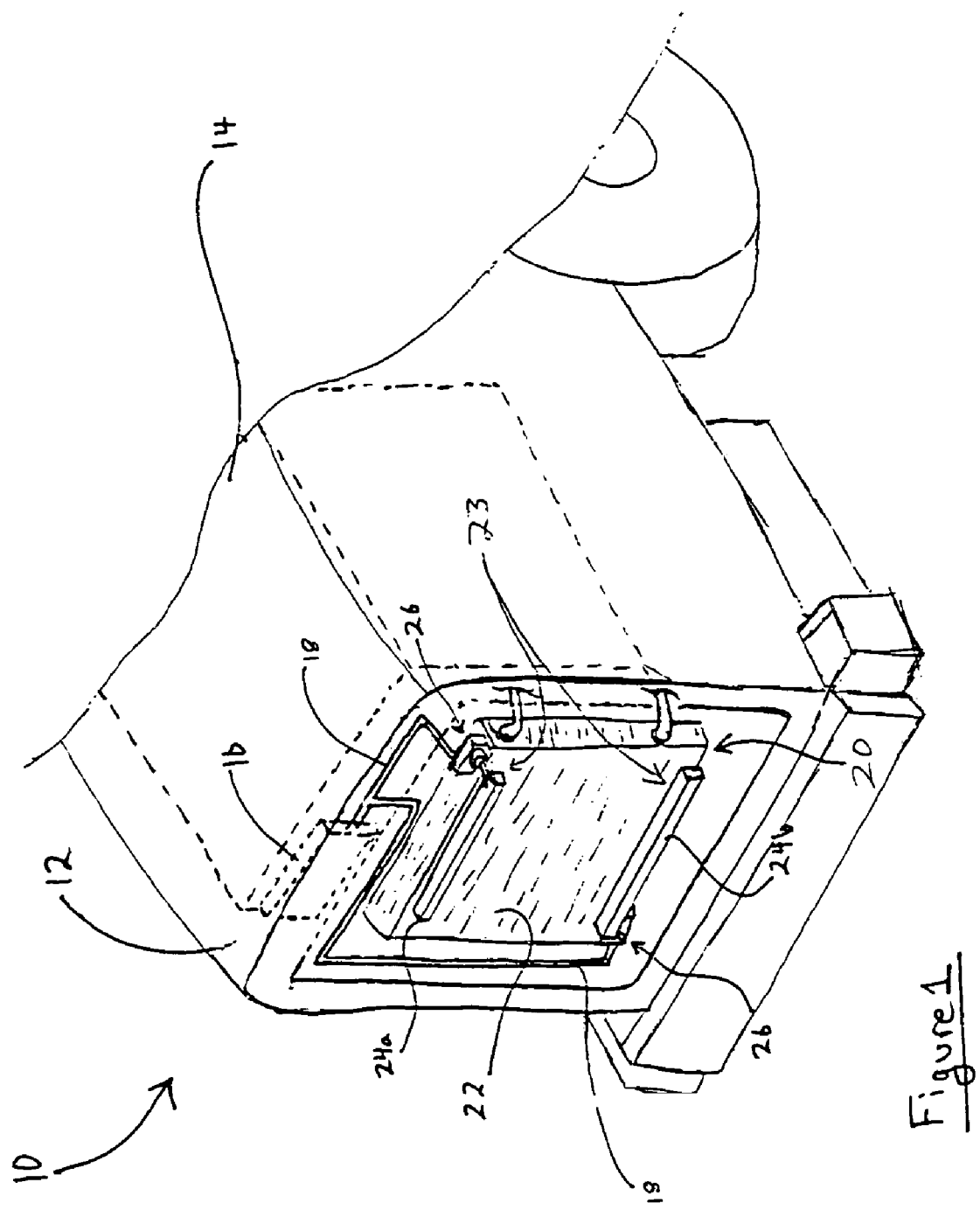
FIG. 1 is a perspective view of a back portion of a work machine according to the present disclosure.

Referring to FIG. 1, there is shown a perspective view of a back portion of a work machine 10 according to one embodiment of the present disclosure. Work machine 10 includes a work machine body 12, an engine 14 and a radiator assembly 20 that includes a finned radiator core 22. Radiator assembly 20 will include a debris removing apparatus 23, configured to direct compressed air toward radiator core 22 to remove debris, as described herein. Although it is contemplated that work machine 10 will in many embodiments be an off-highway work machine, such as a wheel loader or off-highway truck, the present disclosure is not thereby limited. For example, an on-highway truck, a backhoe loader, or even an excavator or track-type work machine might benefit from the teachings of the present disclosure and fall within its scope.

Debris removing apparatus 23 may further include at least one movable member, for example, two similar movable members 24a and 24b that are coupled with work machine body 12 via housings 26 disposed at opposite corners of radiator core 22. Each of movable members 24a and 24b may comprise an arm 21 configured to sweep across radiator core 22, and thereby direct compressed air toward and through radiator core 22. Arms 21 may be swept back and forth across radiator core 22, each of arms 21 moving in a periodic motion. In one embodiment, the periodic motions of each of arms 21 may be characterized by the same frequency, but at different times to avoid collision thereof.

Compressed air may be supplied to debris removing apparatus 23 from an onboard compressed air supply 26 such as an air compressor operably coupled with engine 14, or an onboard air storage tank for example, via a compressed air passage 18. Passage 18 may connect with each of housings 26 via a compressed air inlet 40. The compressed air passed through radiator core 22 will urge debris between the fins and ultimately completely through radiator core 22.

Figure 2:
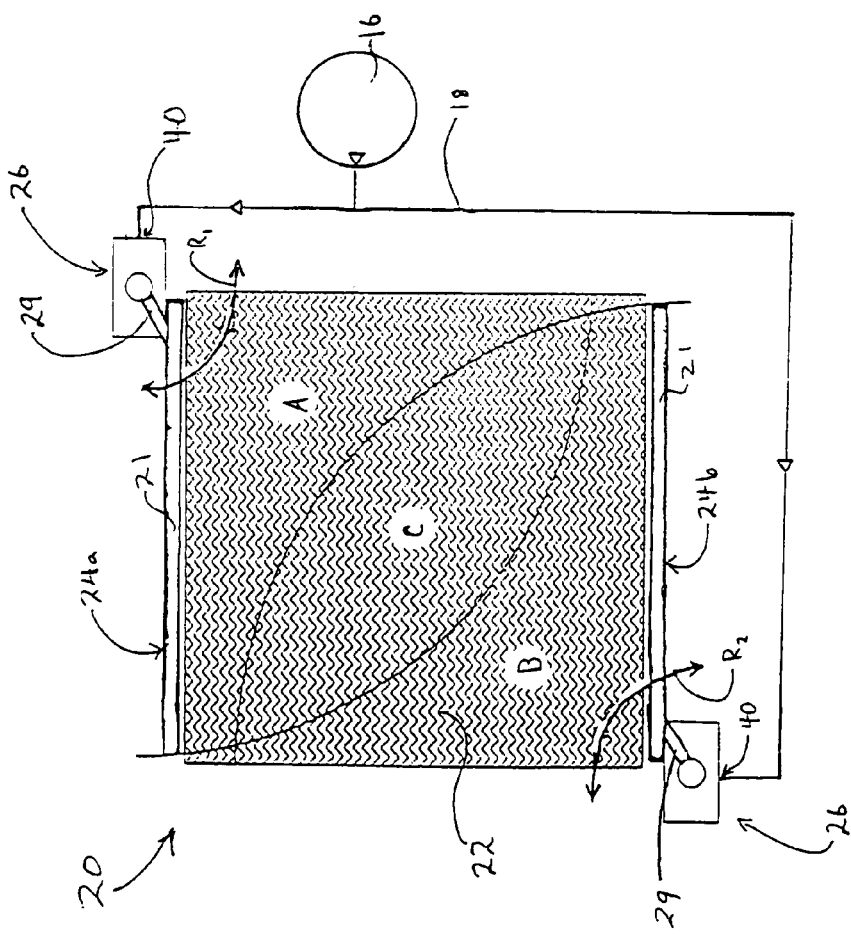
FIG. 2 is a diagrammatic front view of a radiator assembly according to the present disclosure.

Referring now also to FIG. 2, there is shown a front view of radiator assembly 20. Each of movable members 24a and 24b may be coupled with housing(s) 26 via a connector 29. In the embodiment of FIG. 2, radiator core 22 may be thought of as having a face with three separate regions. A first face region, "A", is swept by member 24a as it travels back and forth across radiator core 22, thereby defining an arc $R_2$, and directing compressed air generally toward region A. A second face region, "B", is similar to region A and is swept by movable member 24b as it travels in another arc $R_2$ back and forth across radiator core 22. A third face region, "C", may lie approximately between regions A and B, and includes a face portion of radiator core 22 that is swept by both of movable members 24a and 24b. Thus, each of movable members 24a and 24b may be passed across region C, resulting in a somewhat more robust debris removing effect. In certain embodiments, it may be desirable to provide greater debris removing capability to a center region of the radiator core, such as region C in FIG. 2, to ensure the highest heat dissipating effect possible. Debris in the center region may have an especially acute effect on the efficiency of the radiator assembly's operation.

A wide variety of configurations are possible for radiator assembly 20 within the scope of the present disclosure, and the embodiment shown in FIG. 2 should not be construed to limit the breadth thereof. For instance, rather than having dual arms disposed at opposite corners of radiator core 22, a single movable member might be provided which sweeps across the entire face of the radiator core. Alternatively, rather than passing the movable member and its air stream(s) across the entire face of a radiator core, only a portion might be treated. Further, the movable members for supplying compressed air need not include arms configured to sweep across the radiator core in an arc at all. In alternative contemplated embodiments, a movable member could be mounted on tracks disposed along opposite sides of the radiator core, and moved across the face of the radiator core without changing the angular orientation of the movable member relative to the core at all. Still further embodiments are contemplated wherein rather than movable members, a compressed air outlet in a stationary apparatus is provided in such a configuration that compressed air may be directed toward and through the entire face of the radiator core at once, or a portion thereof.

Figure 3:
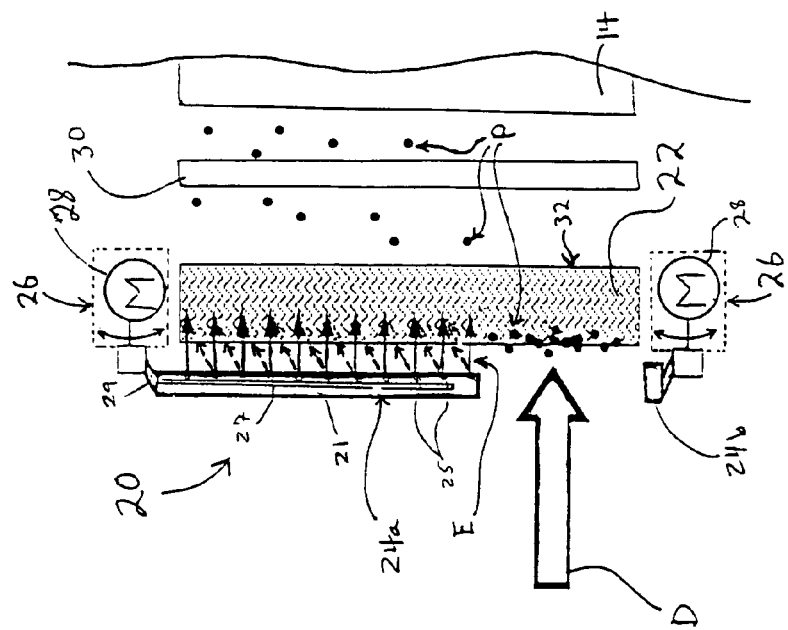
FIG. 3 is a diagrammatic side view of a radiator assembly and a portion of an engine, according to the present disclosure.

Turning now to FIG. 3, there is shown a side view of a radiator assembly 20 similar to that shown in FIG. 2. Radiator assembly 20 is shown disposed adjacent a radiator cooling fan 30, in turn adjacent engine 14. In the embodiment of FIG. 3, fan 30 is adjacent a back face 32 of radiator core 22. Arrow D illustrates an approximate direction of radiator cooling air that will be drawn through radiator core 22. In an embodiment wherein fan 30 is disposed on the opposite side of radiator core 22, radiator cooling air will be blown toward and through radiator 22 by fan 30, rather than drawn through.

In FIG. 3, reversible electric motors 28 are shown disposed within each of housings 26. Electric motors may provide one practical implementation strategy for a radiator assembly according to the present disclosure. In such an embodiment, conventional, reversible electric motors similar to the type commonly used in windshield wiper assemblies may be used. Such motors are readily available from numerous commercial sources. In other embodiments, pneumatic or hydraulic motors might be used. Any motor configuration, or any motor type, may be used which is suitable for the application. Pneumatic motors may be particularly advantageous in certain embodiments, given the ready availability of the compressed air already supplied to apparatus 23, as described herein.

Although it is contemplated that a wide variety of designs may be suitable for movable members 24a and 24b, a pneumatic apparatus known in the art as an "air knife" may be incorporated therewith in one practical implementation strategy. As used herein, the term "air knife" should be understood as an apparatus that comprises an elongate arm having a passage therein for compressed air which connects with one or more specially shaped outlet orifices for discharging a stream or streams of compressed air in a predetermined orientation. For instance, there may be one or more slit shaped orifices oriented to direct a knife edge of high velocity fluid in a desired direction. Such an apparatus may be coupled with connector(s) 29 or otherwise movably connected with housing(s) 26 in any suitable manner. Certain suitable air knives may be configured to entrain ambient air in addition to the air supplied from a compressed air supply. The Standard Air Knife™ available from Exair Industries of Cincinnati, Ohio represents one example of an off-the-shelf apparatus suitable for use in the present disclosure. Other air knives are available from other commercial sources.

In the embodiment of FIG. 3, movable member 24a is shown in a side view wherein a plurality of outlet orifices 25 are illustrated spaced along an elongate arm 21 that is part of movable member 24a. Compressed air supplied from compressed air supply 16 (not shown in FIG. 3) may be supplied to each of orifices 25 via a passage 27 internal to arm 21. Arrows E in FIG. 3 illustrate an approximate direction of compressed air flow from arm 21 toward radiator core 22. It is contemplated that in many embodiments, air will exit arm 21 predominantly in a direction normal to the face of the subject radiator core. In alternative embodiments (shown with dotted line), at least a portion of orifices 25 may be configured to direct the exiting air predominantly in a direction other than normal to the face of radiator core 22. For example, at least some of orifices 25 could be configured to direct air at an angle between normal and 90 degrees relative to the face of radiator core 22. In such an embodiment, debris on or in radiator core 22, particularly relatively larger pieces of organic debris, may be blasted off of the face of radiator core 22 rather than through it. It should further be appreciated that, rather than discrete orifices formed in arm 21, a single slit or similar air outlet might be used. An elongate slit aligned with a length dimension of arm 21 could be used to provide a relatively uniform curtain of compressed air from arm 21 if desired.

INDUSTRIAL APPLICABILITY

Referring to the drawing Figures generally, when debris is determined to have accumulated on or in radiator core 22, or at a scheduled maintenance time, for example, one or both of movable members 24a and 24b may be swept across regions A, B and C of radiator core 22. Compressed air exiting orifices 25 at relatively high velocity will travel generally toward radiator core 22, at least a portion of the compressed air typically, but not necessarily traveling through radiator core 22 and urging debris along with it. In FIG. 3, a plurality of particles "P" are shown accumulated in a region of radiator core 22. Some of the particles are illustrated having passed through radiator core 22 due to the application of compressed air supplied via movable member 24a, whereas the not-yet-treated portion of radiator core 22 includes particles P still lodged therein.

The frequency with which debris removing apparatus 23 is used to clear debris from radiator core 22 will vary based on a number of factors. An important one of these will be the efficiency of radiator assembly 20. When freshly cleaned with debris removing apparatus 23, radiator assembly 20 will generally operate relatively close to its maximum theoretical heat rejection capability. As debris accumulates over time, the caked on debris may reduce the efficiency with which radiator 20 can remove heat from engine 14. Engine 14 will thus typically run relatively hotter as debris accumulates on radiator core 22, or coolant fluid will have to be pumped more quickly through radiator core, etc. By monitoring the operating efficiency of radiator assembly 20, either by determining operating temperatures of engine 10 or by some other means, an operator or technician may determine an appropriate frequency with which to use debris removing apparatus 23.

Other important factors may be the nature of the operating environment, e.g. the amount of debris, in particular inorganic debris, encountered by work machine 10 as it operates, and the operating demands placed on engine 10. In dusty environments, for example, or where especially large amounts of heat must be extracted from engine 14 such as during long periods of high speed or high load operation, it may be desirable to use debris removing apparatus 23 relatively more frequently. Where dust or operating demands on engine 14 are more modest, use of device 23 may be less frequent. Either manual activation of device 23 or some sort of electronically controlled activation may be implemented. In either scheme, it is contemplated that at least some of the time, device 23 will be disabled. In other words, although it would certainly be possible to operate debris removal apparatus 23 continuously during work machine operation, for example in an especially dusty environment, such will not typically be the case.

Regardless of whether debris removing apparatus 23 is activated as desired by an operator, or as part of a predetermined maintenance routine, the use of on-board compressed air allows maintenance of radiator efficiency without ceasing operation, and without disassembling components in the field or at the shop. An operator or electronic controller may simply activate debris removal apparatus 23 for a time and at a frequency calculated or estimated to be sufficient to keep work machine 10 operating as desired.

It is further contemplated that the present disclosure will find particular application in radiator assemblies having cores with relatively closely spaced fins. Many conventional radiators have fins that are sufficiently widely spaced that relatively small debris, inorganic dust for example, tends to be pushed through the radiator core rather than lodging between the fins and other components and reducing operating efficiency. In addition, certain older engine systems included a radiator cooling fan disposed on the side of the radiator core opposite the engine. In some newer designs, the cooling fan is disposed between the radiator and engine and pulls, rather than pushes, radiator cooling air through the radiator core. Each of these changes in technology, more closely packed fins and rearrangement of the cooling fan, while providing certain advances in operating efficiency and packaging of engine systems, has resulted in new technical challenges. Thus, the present disclosure provides an apparatus and method applicable to problems in the industry that have developed only relatively recently. However, those skilled in the art will appreciate that in addition to newer designs, conventional radiator and engine systems may also benefit through application of the teachings set forth herein.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while it is contemplated that an apparatus mounted in the engine compartment of work machine 10, and capable of being activated from an operator cabin or via an electronic controller will be advantageous, the present disclosure is not thereby limited. It should be appreciated that the present disclosure is fairly considered to also encompass systems using an on-board compressed air supply connected with a manually operated wand configured or used to direct air through radiator core 22, for example. Thus, it is not critical that the debris removing apparatus even be physically mounted inside the engine compartment, or that it be motor driven. Other aspects, features and advantages will be apparent upon an examination of the attached drawings and appended claims.

What is claimed is:

1. A radiator assembly comprising:
   a finned radiator core;
   a debris removing apparatus having a compressed air inlet and at least one compressed air outlet configured to direct compressed air through said radiator core;

said radiator core comprises a front face and said debris removing apparatus comprises an arm movable across at least a portion of said front face, and having said at least one compressed air outlet disposed therein;

said debris removing apparatus comprises an air knife that includes a housing and a motor disposed within said housing and operably coupled with said arm, said arm being movable in a periodic motion;

said air knife comprises a first air knife positioned proximate a first corner of said radiator core and movable in an arcuate path; and said radiator assembly comprises a second air knife similar to said first air knife and disposed proximate a second corner of said radiator core, said second air knife being movable in an arcuate path partially overlapping the arcuate path of said first air knife.

2. The radiator assembly of claim 1 wherein said radiator core comprises a back face opposite said front face, said radiator assembly comprising a cooling fan disposed adjacent said back face.

3. The radiator assembly of claim 1 wherein at least a portion of said plurality of outlets are configured to direct compressed air toward the front face of said radiator core, but predominantly in a direction other than a direction normal to said front face.

4. A machine comprising:
a body;
a pressurized gas supply mounted to said body;
a radiator mounted to said body and including a finned radiator core having a face;
a debris removing apparatus having a pressurized gas inlet connecting with said pressurized gas supply, and at least one pressurized gas outlet configured to direct a gas toward the face of said radiator core;

an internal combustion engine, wherein said pressurized gas supply comprises a compressed air supply of the machine having an air compressor operably coupled with said internal combustion engine;

said debris removing apparatus comprises an air knife having a movable arm with at least one compressed air outlets disposed therein and configured to direct air through a front and out a back of said radiator core;

said air knife includes a housing mounted adjacent said radiator and a motor disposed within said housing and operably coupled with said arm; and said air knife comprises a first air knife movable in a periodic motion across a first portion of the face of said radiator core, said machine further comprising a second air knife similar to said first air knife and being mounted adjacent said radiator and movable in a different periodic motion across a second portion of the face of said radiator core.

5. The machine of claim 4 wherein:
said radiator core comprises first and second sides;
the first air knife and the second air knife being mounted adjacent said first and second sides of said core, respectively; and
the arm of said first air knife and the arm of said second air knife being movable across a common portion of the face of said radiator core.

6. The machine of claim 4 wherein said motor comprises an electric motor.

* * * * *